United States Patent [19]
Dextraze et al.

[11] Patent Number: 5,541,835
[45] Date of Patent: Jul. 30, 1996

[54] MONITORING AND FORECASTING CUSTOMER TRAFFIC

[75] Inventors: Marcel Dextraze, Longueuil; Miguel A. Marin, St-Lambert, both of Canada

[73] Assignee: Jean-Guy Bessette, Quebec, Canada

[21] Appl. No.: 95,520

[22] Filed: Dec. 29, 1992

[51] Int. Cl.⁶ .................................................... G06F 63/00
[52] U.S. Cl. ...................................... 364/401 R; 364/402
[58] Field of Search ................................... 364/401, 402, 364/513, 578, 148; 340/824, 826, 286 R

[56] References Cited

U.S. PATENT DOCUMENTS

| | | | |
|---|---|---|---|
| 3,803,578 | 4/1974 | LaVanway | 340/286 R |
| 4,700,295 | 10/1987 | Katsof et al. | 364/401 |
| 4,965,743 | 10/1990 | Malin et al. | 364/513 |
| 5,163,000 | 11/1992 | Rogers et al. | 364/424.01 |
| 5,250,941 | 10/1993 | McGregor et al. | 340/825.65 |

FOREIGN PATENT DOCUMENTS 1137615 12/1982 Canada.

Primary Examiner—Gail O. Hayes
Assistant Examiner—Frantzy Poinvil
Attorney, Agent, or Firm—Longacre & White

[57] ABSTRACT

A system for monitoring and forecasting customer traffic and customer servicing at a location wherein each customer may be served at any one of a plurality of available service stations. A detector at the entrance of a defined area detects passage of a customer at the entrance. At each service station, a sensor detects the presence of a customer proximate to the station. A data processor is used for registering the time of the day when the passage is detected, the time of the day when a change of state occurs at each station. The times and the type of event registered are then computed by a method, known as the discrete event modelling and simulation, to establish customer traffic monitoring and forecasting.

2 Claims, 1 Drawing Sheet

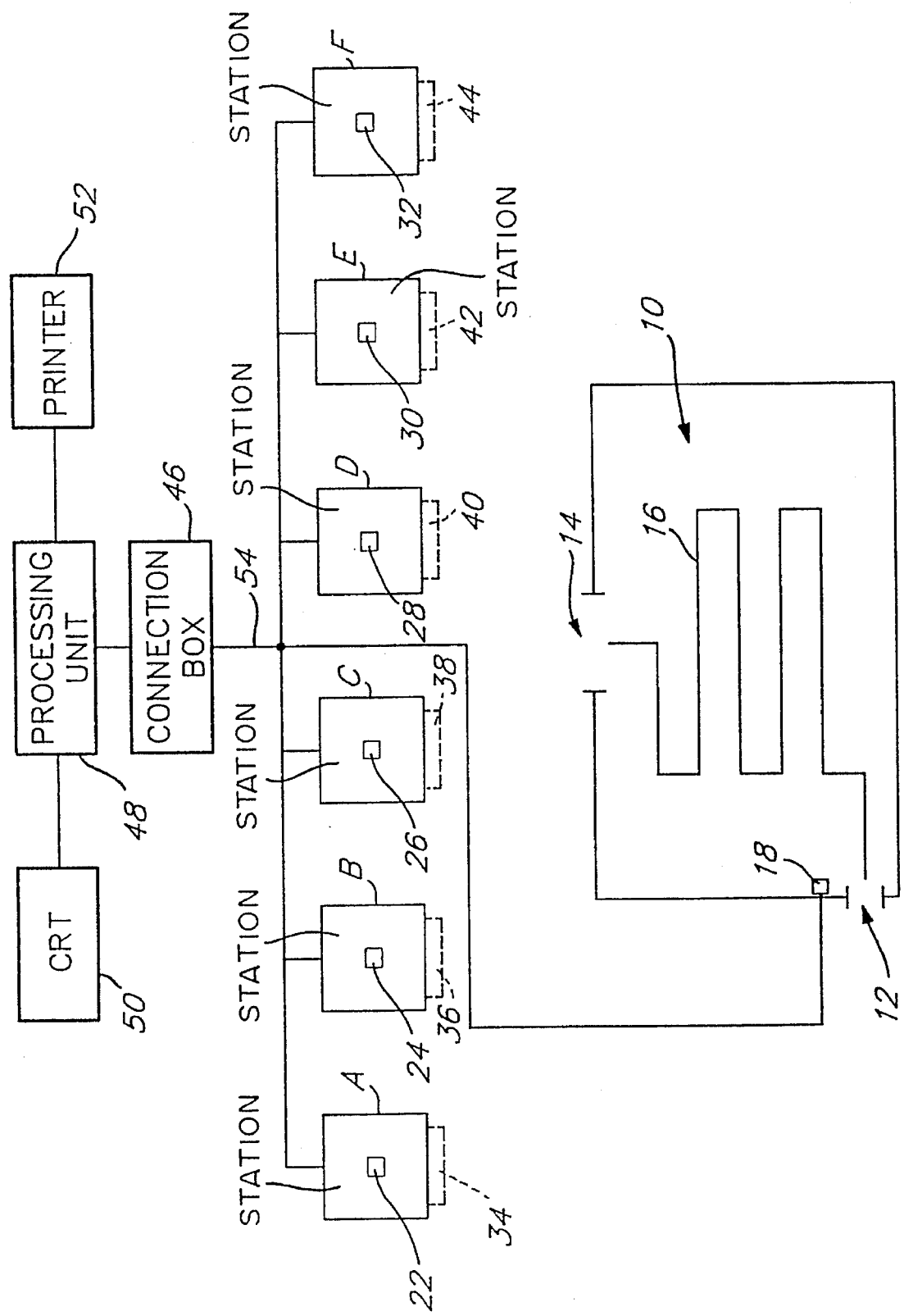

MONITORING AND FORECASTING CUSTOMER TRAFFIC

FIELD OF THE INVENTION

The present invention relates to a method and a system for monitoring and forecasting customer traffic and customer servicing at a location wherein each customer may be served at any one of a plurality of available service stations.

BACKGROUND OF THE INVENTION

A system and method for forecasting bank traffic and scheduling work assignments for bank personnel are described in U.S. Pat. No. 4,700,295 issued Oct. 13, 1987 to Katsof et al. This patent discloses a system which uses data gathering means for sensing the arrival and departure of customers as well as when a teller is at a station. Data processing means counts the arrivals and departures and measures the amount of time that the teller is active at each station. Two detectors are used: one at the entrance to a queue, the other at the exit of the queue. The forecasting method uses a queuing model to obtain forecast of waiting time per customer and teller utilization. A record is kept of the number of arrivals observed during each interval and of the average service time per each day of the week.

OBJECTS AND STATEMENT OF THE INVENTION

It is an object of the present invention to provide a system and a method for monitoring and forecasting customer traffic and customer servicing in a manner which greatly reduces mathematical computations, which increases the accuracy in real time and which uses less components than in the systems of the prior art.

This is achieved by providing a system and a method which uses a computing approach known as the Discrete Event Modelling and Simulation (DEMS) which is well known in the literature and is described in various articles, including "Introduction to Simulation and SLAM II", Third Edition, 1986, A. Allan B. Pritsker, chapter II (pages 380–427).

Discrete event modeling consists in modeling a system by describing the changes that occur in the system at discrete points in time. Basic to this method is the concept of "event time" which is defined as an isolated point in time where the state of the system may change; an "event" is known as the associated logic for processing the changes in state of the system.

A discrete event model of a system is constructed by defining types of events that can occur and then by modeling the logic associated with each event type.

The dynamic behaviour of the system is produced by representing, in a time-ordered sequence, the changes in states according to the logic of each event.

In discrete event simulation, the system status changes only at the beginning of an activity when something is started or at the end of the activity when something is terminated. Events are used to model the start and completion of activities.

When an event occurs, the state of the model can change in two ways:

1) by altering the value of one or more variables;

2) by altering the relationship among values assigned to one or more variables through file manipulation.

To clarify the above definitions and the application of the DEMS approach, the following event model of a single-queue single-server situation is considered.

Consider a bank with one teller. The "states" of the system will be measured by two types of event:

1) a customer arrival event in waiting line; and 2) an end-of-service event at a station.

It will be assumed that all significant changes in the system status can occur only at the arrival time of a customer in line or at the time the service ends; in other words, the system does not change status between these two event times.

The model uses a file (queue) ranked first-in, first-out (FIFO) for storing variables values regarding customers waiting for service or for the service activities.

This example shows that a complete modeling and simulation of the bank-teller system needs only two types of inputs, namely:

1) customer-arrival times in waiting line (i.e. sensing the passage of a customer and match the time of the day that this event occurs), and 2) customer end-of-service time at a station (i.e. sensing the customer departure of a station and match the time of the day that this event occurs)

With these two inputs, it is possible to model and simulate the behaviour of the system and compute statistics based on observations (customer waiting time) and time persistent variables (teller utilization).

The present invention therefore relates to a system for monitoring and forecasting customer traffic and customer servicing at a location wherein each customer may be served at any one of a plurality of available service stations, the customers being in a defined area having an entrance and an exit, the system comprising:

A) data gathering means including:

detecting means, at the entrance, for detecting passage of a customer at the entrance;

sensing means, at each service station, for sensing the presence of a customer proximate to the station;

clock means to generate in real time the date of the day, the hour, minute and second that a detecting means and sensing means are activated;

registering means for collecting information relative to the detecting means and sensing means;

B) data processing means including:

means for registering the time of the day when passage is detected;

means for registering the time of the day when the sensing means is activated or deactivated at each station;

means providing logical comparison between the types of events and the related times registered by the registering means; this logical comparison being established by using a discrete event modeling and simulation method to thereby monitor and forecast customer traffic.

The present invention also relates to a method for monitoring and forecasting customer traffic and customer servicing at a location wherein each customer may be served at any one of a plurality of available service stations, the customers being in a defined area having an entrance and an exit, comprising the steps of:

detecting, at the entrance, passage of a customer thereby;

registering the time of the day when passage is detected;

sensing, at each service station, a change of state resulting from a customer being proximate, or not, to the station;

registering the time of the day when a change of state occurs at each station; and establishing the logical comparison between the event times registered by using a discrete event modeling and simulation method to thereby monitor and forecast customer traffic.

Some of the advantages obtained with the present invention are:

1) only one detector is needed at the entrance of the queue instead of two used in the prior art systems;

2) no timer is started to measure the amount of time. The system needs only the type of events and at what time of the day these events are generated;

3) the interaction between events with reference to the real time allows to determine the presence of customers at a station; it is thus possible to determine if a customer came from other than the waiting line;

4) logical comparison between different event times allows the self-adjustment of the system in case of skew (or difference), between the system waiting line and the real one;

5) historical data may be accumulated as usually; the computing statistics can be applied to load forecasting by feeding them into the simulated system using the DEMS approach.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is a schematic drawing of a system made in accordance with the present invention.

DESCRIPTION OF PREFERRED EMBODIMENTS

Referring to FIG. 1, there is shown a defined area, generally denoted 10, having an entrance 12 and an exit 14. In this area, there may be a single queue, such as the one illustrated as 16, or various queue arrangements allowing customers to be present at some time at the exit 14 for servicing.

A detector 18 is located at the entrance 12 and detects the passage of a customer in or out of the entrance 12. Should there be more than one entrance, additional detectors are required for each of those entrances.

The A, B, C, D, E or F identify the available service stations. A sensor 22, 24, 26, 28, 30, 32, preferably hidden, is located at each teller station to detect the presence of a customer in the detecting field 34, 36, 38, 40, 42, 44 associated with each teller station. The sensor at each station detects the arrival or departure of a customer to that station as well as the entrance or exit of the customer in the detecting field. In other words, if a customer being served moves out of the detection field for some reason and then returns therein for further servicing, the sensor will detect two presences.

A connection box 46 interconnects the sensors 22, 24, 26, 28, 30, 32 and the entrance detector 18. Box 46 is connected to an input/output processing unit 48 which forms part of a computer system that also includes a CRT display 50 and a printer 52. The processing unit 48 starts and shuts down the operation, has a storage device to record data, computes statistics and maintains a real time clock such as the date of the day and the time of the day (hour,minute,second) required for events gathering. The CRT display 50 is an interface between the processing unit and the operator. It serves to manipulate the system. The printer serves for output statistical reporting.

In operation, customers enter into waiting line 16 thus activating the entrance detector 18. The sensor at each station detects the arrival or departure of each customer. The connection box 46 recognizes the type of event and match the clock time, coming from the processing unit 48, to these events. Regularly, the connection box 46 send the accumulated data in RAM memory to a storage device in the processing unit 48.

The entrance detector in line and the sensor at each station are the only devices which trigger a change of state in the system. Therefore, each customer has two basic variables associated to it. The first variable is the activation of the entrance detector and the clock time of the day associated to that event. The second variable is the activation of the sensor at the station ant the clock time of the day associated to that event.

The system keeps in file only the type of events and the corresponding clock time of the day at which those events have been triggered.

A logical comparison of the contents of these file is effected by means of the discrete event modeling and simulation method described above. With this logical analysis, it is possible to detect differences between the system waiting line file and the real waiting line, produce daily or monthly reports of customer service and teller utilization, determine the statistical distribution of customer waiting time and teller service times, and produce load forecasting by system simulation.

In the present system, there are two software components: the application software dedicated to monitor the real time operation of the system; and the application software dedicated to load forecasting. The first application is basically a data acquisition system tailored to the needs of the DEMS method. The second application uses statistical formulas to derive the distribution of the historical data collected. A discrete-event-based software simulator constructed on the basis of the method described above, is used to forecast system load.

Although the invention has been described above with respect with one specific application, i.e. bank, it will be evident to a person skilled in the art that it may be modified and refined in various ways to be used in other application where a customer in line waits to be served by any one of a plurality of servicing stations. For example, some display means may be provided at the exit 14 to inform the customer waiting in line which of the service stations is available for servicing. It is therefore wished to have it understood that the present invention should not be limited in scope, except by the terms of the following claims.

The embodiments of the invention in which an exclusive property or privilege is claimed are defined as follows:

1. A system for monitoring and forecasting customer traffic and customer servicing at a location wherein each customer may be served at any one of a plurality of available service stations, the customers being in a defined area having entrance means, said system comprising A) data gathering means including:
- detecting means, at the entrance, for detecting passage of a customer at the entrance means;
- sensing means, at each service station, for sensing the presence of a customer proximate to the station;
- clock means to generate in real time, the date of the day, the hour, minute and second that at least one of the detecting means and sensing means are activated;
- registering means for collecting information relative to the detecting means and sensing means;

B) data processing means including:
- means for registering the clock time of a day when passage is detected;
- means for registering the clock time of a day when the sensing means is activated or deactivated at each station;
- means providing logical comparison between the types of events and the related clock times registered by the registering means; said logical comparison being established by using a discrete event modelling and simulation method to thereby monitor and forecast customer traffic.

2. A method for monitoring and forecasting customer traffic and customer servicing at a location wherein each customer may be served at any one of a plurality of available service stations, the customers being in a defined area having one or several entrance, comprising the steps of:

- detecting, at the :said entrance, passage of a customer thereby;
- registering the clock time of the day when said passage is detected;
- sensing, at each service station, a change of state resulting from a customer being proximate, or not, to the station;
- registering the clock time of the day when said change of state occurs at each station; and
- establishing the logical comparison between the event times registered by using a discrete event modelling and simulation method to thereby monitor and forecast customer traffic.

* * * * *